(12) United States Patent
Prado Alvarez

(10) Patent No.: US 6,581,513 B1
(45) Date of Patent: Jun. 24, 2003

(54) MODULAR BARBECUE

(76) Inventor: Jose Luis Prado Alvarez, Calle Santa Rosa, 26, Lugo de Llanera B-33690 (ES)

( * ) Notice: Subject to any disclaimer, the term of this patent is extended or adjusted under 35 U.S.C. 154(b) by 0 days.

(21) Appl. No.: 09/857,356

(22) PCT Filed: Oct. 4, 2000

(86) PCT No.: PCT/ES00/00378

§ 371 (c)(1),
(2), (4) Date: Jul. 16, 2001

(87) PCT Pub. No.: WO01/24674

PCT Pub. Date: Apr. 12, 2001

(30) Foreign Application Priority Data

Oct. 4, 1999 (ES) .......................................... 9902503 U

(51) Int. Cl.⁷ .............................. A47J 37/00; A47J 37/07
(52) U.S. Cl. .............................. 99/482; 99/340; 99/357; 99/450; 126/9 R; 126/25 R
(58) Field of Search ............... 99/339, 340, 419–421 V, 99/357, 427, 444–450, 481, 482; 126/25 R, 9 R, 163 R, 25 A

(56) References Cited

U.S. PATENT DOCUMENTS

| 2,666,425 A | * | 1/1954 | Hastings, Jr. ............. 126/25 R |
| 3,025,784 A | * | 3/1962 | Williams ................... 126/25 R |
| 3,175,549 A | * | 3/1965 | Bergsten ................... 99/421 H |
| 3,199,503 A | * | 8/1965 | Hanson ..................... 99/339 X |
| 3,343,527 A |   | 9/1967 | Manteris |
| 4,658,710 A |   | 4/1987 | Quet et al. |
| 5,431,093 A |   | 7/1995 | Dodgen |

FOREIGN PATENT DOCUMENTS

| EP | 0 507 199 | 10/1992 |
| ES | 1 039 867 | 2/1999 |
| ES | 1 042 757 | 9/1999 |
| FR | 2 629 180 | 9/1989 |
| WO | 98/46944 | 4/1998 |

* cited by examiner

Primary Examiner—Timothy F. Simone
(74) Attorney, Agent, or Firm—Merchant & Gould P.C.

(57) ABSTRACT

A modular barbecue including a central portion, four lower support legs, and an upper portion. The central portion, made of refractory concrete, is a parallelepipedic body with rectangular base and two chambers, one frontal roasting chamber where foods, placed on a vertically movable steel grill, are roasted, and a rear combustion chamber in which solid fuel or charcoal is transformed into embers that, by actuating on a crank, fall onto the rear chamber bottom. The combustion chamber has its own access gate to introduce the solid fuel or charcoal. The upper portion has two truncated pyramidal pieces with respective conducts for smoke evacuation, a frontal conduct for smoke from the roasting chamber and a rear conduct for smoke from the combustion chamber. Both conducts have respective inner protecting pieces. This upper portion has, on top, a double conduct chimney.

3 Claims, 3 Drawing Sheets

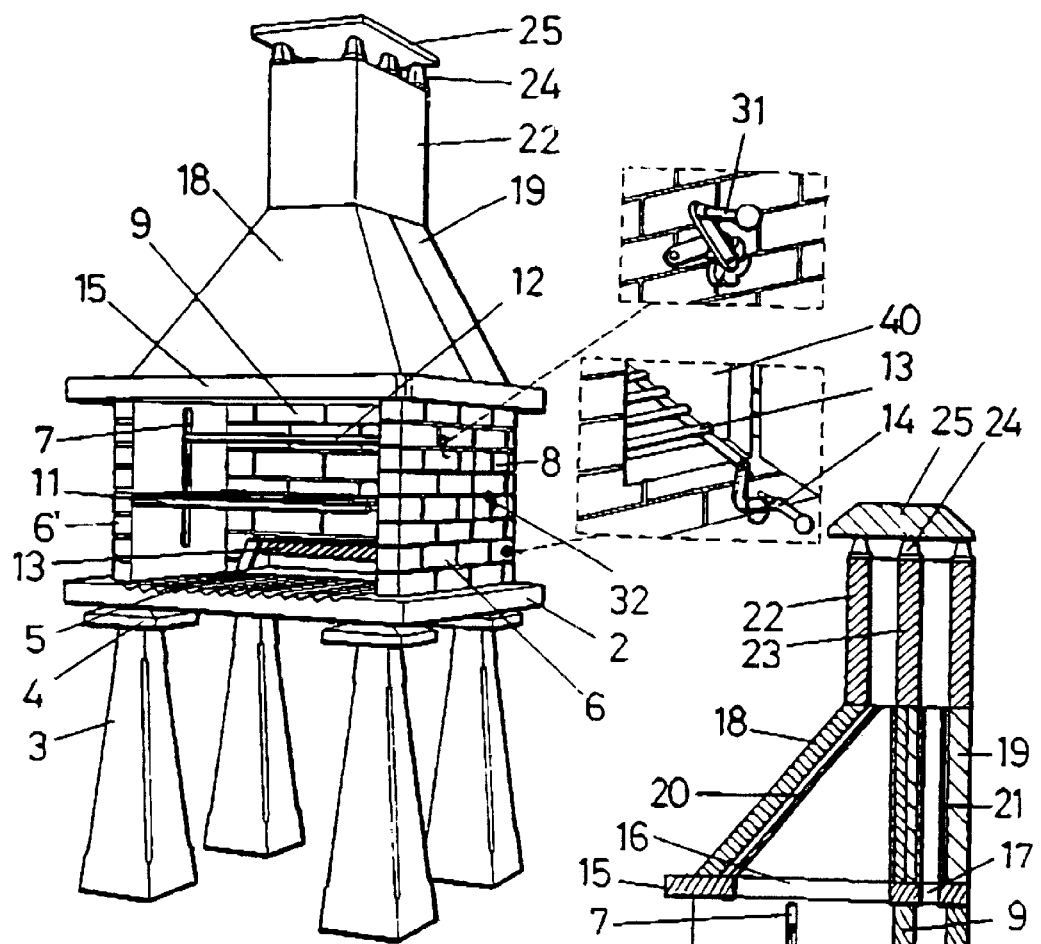
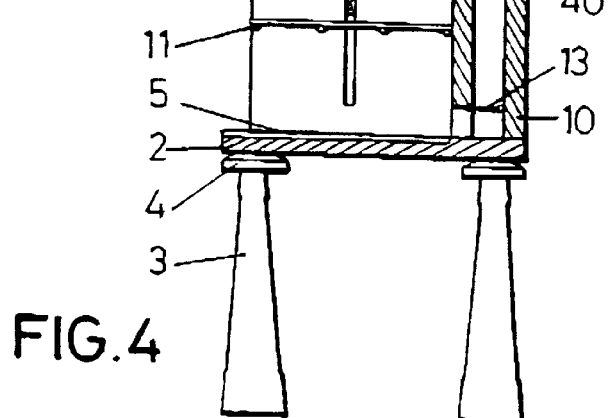
FIG.3
FIG.4

MODULAR BARBECUE

FIELD OF THE INVENTION

This invention has its application in the industry dedicated to manufacture elements for barbecues and similar.

BACKGROUND OF THE INVENTION

The applicant has knowledge of the existence at the present time of a great number and variety of barbecues, all of them manufactured in different materials, mainly concrete and metallic materials, being portable those barbecues manufactured in metallic material, presenting a hollow prismatic structure for the incorporation of fuel, as charcoal, firewood, chips, etc., that is burnt until their transformation in embers, having upper pieces for grills or griddle plates retention, cooperating in some cases with a chimney, presenting an ash drawer and lower trays for the firewood or fuel storage.

The barbecues manufactured in rocky materials, bricks or concrete are undisplaceable, having a cowl-type upper surface covering the roast and combustion chamber, occasionally having grills movable from outside by means of an actuation handle fixed to a chain for movement transmission.

In all cases, during the stage of transformation of fuel into embers and in the light roast stage, it has been verified that barbecues emit to outside environment a great quantity of smoke through the wide front opening, which during the transformation stage is accompanied with sparks, ashes and some small quantity of gas, thus making non-advisable to place the barbecue in areas where environment damages can take place because of said anomalies.

It is not known by the applicant the existence, at the present time, of a barbecue provided with an independent combustion chamber, dedicated to the transformation of the material used as fuel into embers, said chamber having a completely external and differentiated access and being provided the roast chamber as well as the combustion chamber with independent smoke canalizations or outlets, through which a chimney of double body with internal protection is accessed.

Neither it is known by the applicant the existence of a combustion chamber provided with a movable lower grate to allow the evacuation of burning embers.

SUMMARY OF THE INVENTION

The present invention refers to al unproved modular barbecue, configured like a barbecue whose pieces are made of refractory concrete, it being possible, should it be required, to substitute each one of the constituent pieces, presenting in the rear central area of the grill body a chamber for transformation of the fuel used into embers that later on will be used to carry out the roast or light roast operation of foods that will be placed on a grill able to be moved vertically upwards or downwards, said grill being optionally replaceable by a griddle plate also movable vertically upwards or downwards.

The combustion chamber, where the fuel is placed, presents a completely independent access gate, having a grilled piece for holding the fuel.

It is also an object of the invention to implement two independent outlets, one for exiting of the smoke from the combustion chamber, and a second one for withdrawal of the smoke from the cooking chamber, also presenting independent chimneys, the interior of each one provided with complementary pieces to protect the chimney external pieces, thus avoiding the breaking of said chimneys.

The barbecue, due to the incorporation of inside outlets for smoke that is extracted by the venturi effect, can be installed outside as well as inside of a house.

The improved modular barbecue of the invention has an evident novelty in its specific field of application, because it presents advantages not incorporated in the prior art.

Particularly, the improved modular barbecue of the invention comprises a plurality of manufactured pieces of concrete, mounted with metal pieces as the grills, support and rotation shafts as well as an optional griddle plate, having four support legs with upper elements dedicated to receive and support a horizontal piece constituting the base of the roast chamber in whose smaller sides two pieces are located whose external area imitates bricks, presenting internally guides suitable for the support elements sliding, for fixation and movement of a grill, optionally replaceable by a griddle plate, having a chamber in the internal front area, whose lower area presents a grill slightly separated from the bottom end having said piece, that altogether with the rear one constitute the combustion chamber, an opening in its lower part, being accessed the chamber through a door provided with a suitable hinge and a handle located at the right side.

The barbecue is complemented with a handle for moving the fuel supporting grill that, by means of some slight movements, makes the embers to fall down to the lower area, being said embers then transferred by means of a rake to the base upper area where it is placed just under the product to be roasted located on the grill or griddle plate.

Smoke and gases from the combustion ascend by the inside of the combustion chamber where the combustion is performed and are driven to the outside through a chimney located in the rear upper part, said chimney being internally coated by means of a protecting piece that avoids breakage of the external element due to the hot smoke when the chimney is very cold or wet.

Smokes produced by the roasting operation reach the outside through the front upper chimney, and the ends of both upper canalizations converge into a rectangular piece, internally splitted by a cross partition, presenting an upper cowl that is separated from the end of the complementary upper chimney by support pieces.

The grill constituting the food support area, optionally replaceable by a metallic griddle plate, raises and falls by means of a mechanism installed on the internal faces of the side pieces, presenting a handle or crank in the external area for driving said mechanism, said handle or crank being provided with a brake mechanism.

The combustion chamber has an access gate provided with a closing element.

DESCRIPTION OF DRAWINGS

To complement the present description and in order to help for better understanding of the characteristics of the invention, four drawings are attached to the present descriptive document, as integral part thereof, in which, with illustrative and not limitative character, the following has been represented:

FIG. 3 is a perspective view of a completely assembled barbecue, presenting additional details corresponding to the grills and griddle plates movements, and the grills for supporting the fuel.

FIG. 4 shows a side elevational view of a vertical cross section of the barbecue.

PREFERRED EMBODIMENT OF THE INVENTION

Figure 1:
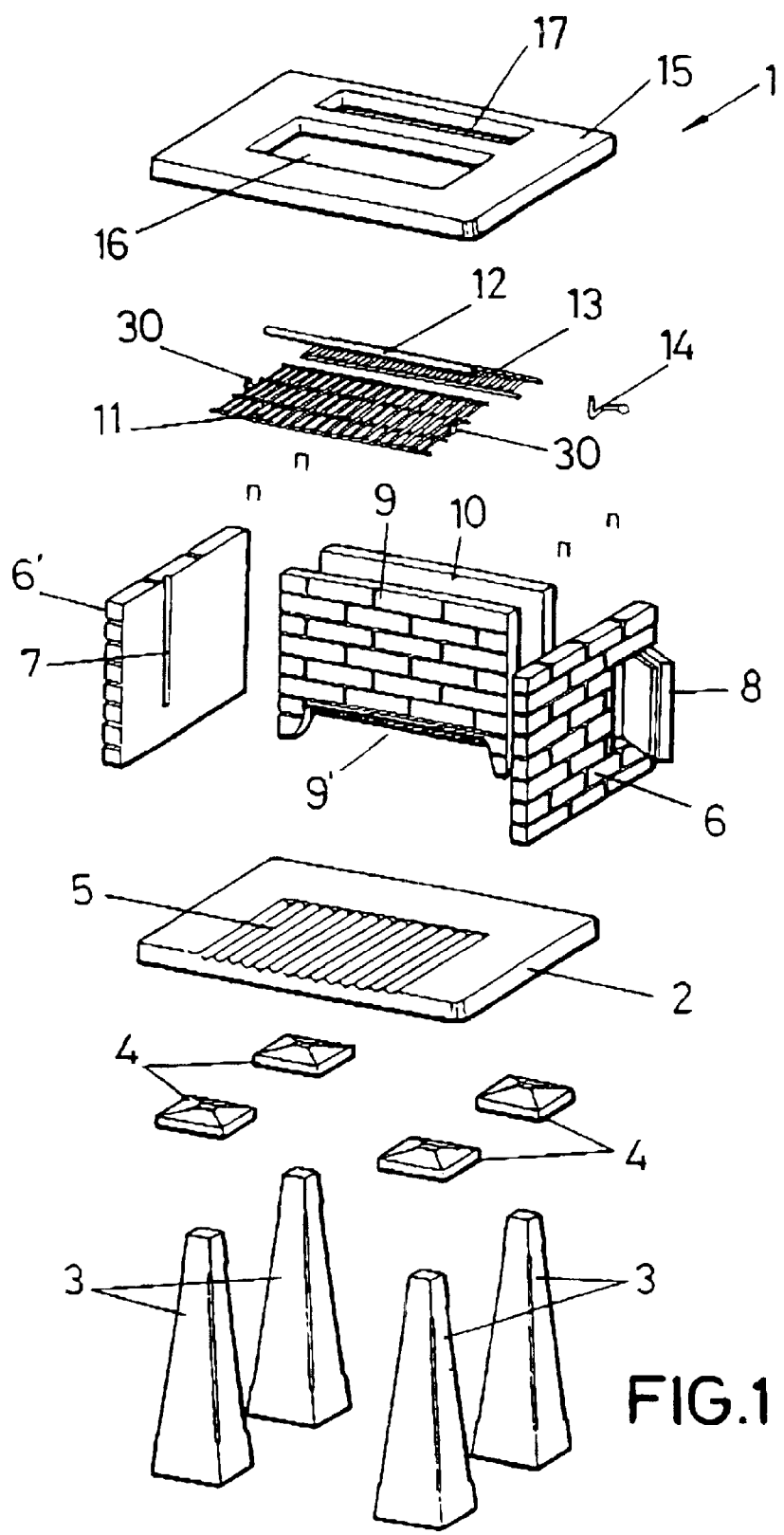
FIG. 1 shows an exploded view of the different elements or pieces constituting the invention, relating to an improved modular barbecue, except for the constituting pieces of the chimneys or pieces for smoke evacuation.
Figure 2:
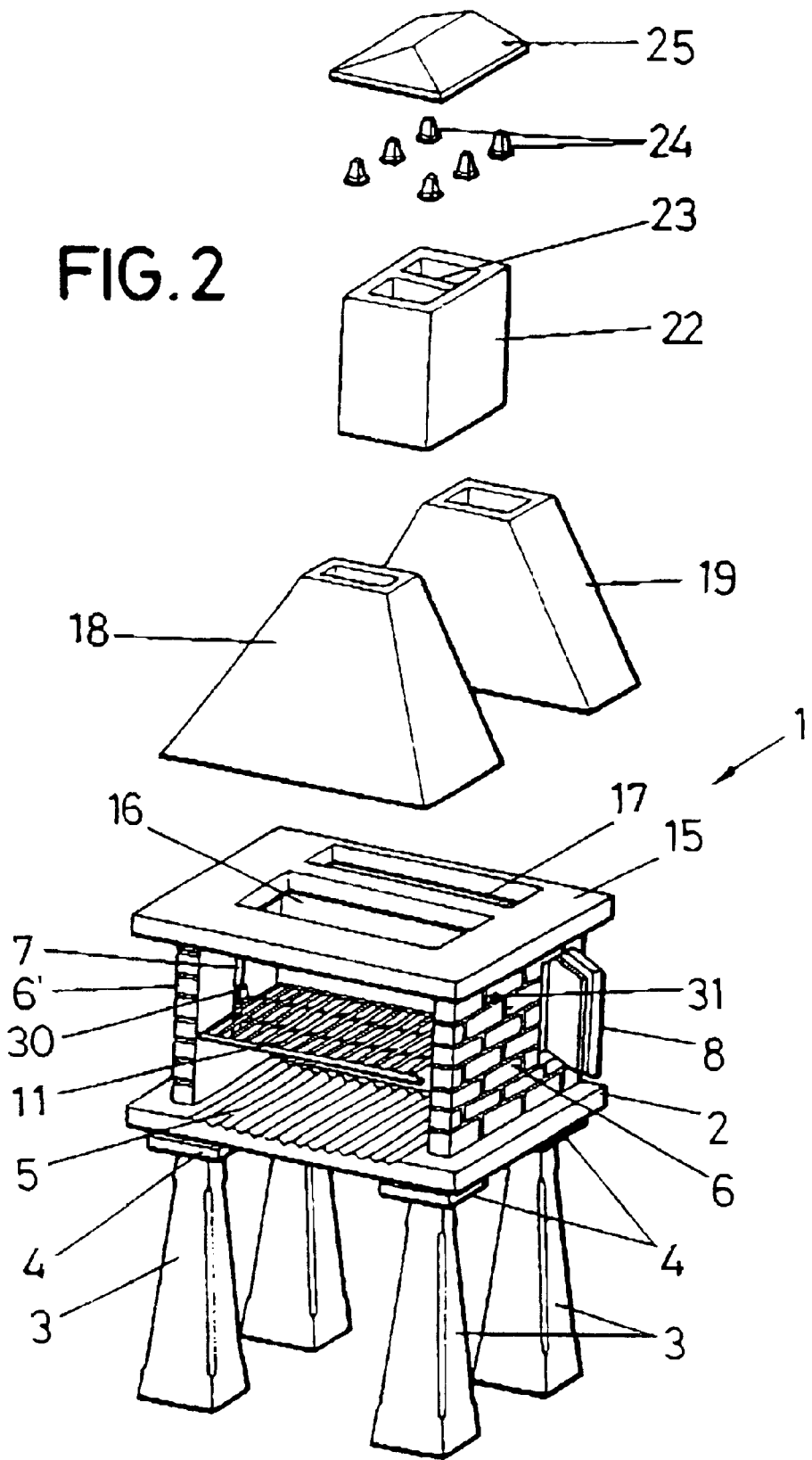
FIG. 2 shows a perspective view of an assembled barbecue, except for the chimneys or pieces for smoke evacuation that appear in exploded view in the upper part.

In view of above figures, it can be observed how the improved modular barbecue (1) is made of a plurality of concrete pieces, except some metallic pieces constituting the grills and griddle plates.

The improved modular barbecue (1) presents a central piece (2) of rectangular plant constituting the central area of the barbecue, on which, and particularly on an area (5) provided with transversal grooves, the fuel converted into embers will be deposited, being the piece (2) supported in the horizontal sense by means of four legs (3) with their upper supports (4), being assembled on the central piece (2) two pieces (6) and (6') on its lateral sides, being said pieces (6) and (6') provided at their internal faces with grooves (7) for fixing a raising and falling mechanism of a grill (11), on which the elements will be placed, presenting in their lateral fixation means (30); the grill (11) can be optionally substituted by a steel griddle plate.

In the rear part of the piece (2) a back piece (10) is vertically assembled and parallel to said piece but in the internal area there is a piece (9) similar to the piece (10), but provided in the inferior part with an opening (9'), through which the embers will come out towards the surface (5) of the piece (2), said embers having previously been introduced through a door (8) existing in the lateral side (6) that gives access to a combustion chamber formed by pieces (9) and (10), inside which there is a grill (13) provided with a crank (14); by slightly actuating the on said crank (14), the embers are moved downwards onto the rear surface of the piece (2), reaching said piece through an opening (9') existing at the lower area of the front piece (9).

The gate (8) has a handle and a lock (32), and the raising and lowering mechanism of the grill has a crank (31) that, cooperating with a transversal support piece (12), allows the grill raising or lowering; the grill (11) can be replaced by a steel griddle plate (nor represented neither referenced).

A piece (15), parallel to piece (2) is placed onto the pieces (6), (6'), (9) and (10), being said piece (15) provided with two rectangular openings (17, 16) with dimensions different in width but not in longitude, through which the smoke from the combustion chamber (40) comes out in upward sense, also the smoke produced by the treatment the foods placed on the grill (11) ascends vertically through the opening (16) to reach the outside through the trunco-pyramidal pieces (18) and (19) respectively located over the openings (16) and (17); it should be noted that pieces (18) and (19) are provided with a respective internal coating piece (20) and (21) that protects the structure of pieces (18) and (19) through their upper openings with a piece (22) provided in its central area with a small transversal partition (23) that acts as driver of smoke toward the outside, having a closing piece (25) supported on the piece (22) by supports (24).

In summary, the invention, formed completely by modular pieces, presents as a fundamental feature the existence in the rear part of a transformation or combustion chamber formed by two partitions (9) and (10) transversally located on the piece (2), that in cooperation with the lateral partitions (6) and (6') configure the transformation chamber, to which access is given through a gate (8) existent in the piece (6), passing the material used as fuel, once converted in embers, to the surface of the piece (2) through the opening (9') when a slightly higher support grill (13), existing inside the combustion chamber (40), is moved by means of the actuation on a handle (14).

The invention also presents as a fundamental feature an internal coating of the pieces (18) and (19) that act as chimneys for the smoke evacuation from the roast and light roast chamber and from the combustion or transformation chamber, leaving said smoke through the pieces (20) and (21) until converging in a canalization piece (22) provided with a central partition (23) and having in its upper part a protecting piece or cowl (25) supported on conventional supports (24).

It is not considered necessary to make this description more extensive so that any expert in the art may understand the scope of the invention and the advantages that are derived thereof.

Materials, forms, sizes and arrangement of the elements will be susceptible of variation, provided that it does not mean any alteration of the essence of the invention.

The terms used in this disclosing document will always be taken in a wide and not limitative character.

What is claimed is:

1. A modular barbecue comprising:
    at least four supporting elements;
    a base element supported on the four supporting elements;
    a left wall placed vertically on the base element at a left side of the base element;
    a right wall placed vertically on the base element at a right side of the base element;
    a back wall placed vertically on the base element at a back side of the base element;
    an intermediate wall placed vertically on the base element and generally parallel to the back wall, the intermediate wall having an opening at its bottom;
    an upper element placed on top of all of the left, right, back and intermediate walls and placed generally parallel to the base element, the upper element having two openings;
    two hollow truncated elements placed on top of the upper element; and
    a hollow element having a transversal partition, the hollow element being placed on top of the two hollow truncated elements;
    wherein the base element, left, right, back, and intermediate walls, and upper element define two chambers, a front roasting chamber and a rear combustion chamber, the opening of the intermediate wall allowing access from the front roasting chamber to the rear combustion chamber in such a way that embers inside the rear combustion chamber may be transferred from the rear combustion chamber to the front roasting chamber through the opening of the intermediate wall, and the openings of the upper element allowing smoke produced in the front roasting chamber and rear combustion chamber to exit.

2. A modular barbecue according to claim 1, wherein a first of the two hollow truncated elements is placed on a front portion of the upper element, covering a first of the openings in the upper element, and a second of the two hollow truncated elements is placed on a red portion of the upper element, covering a second of the openings in the upper element, and wherein the first and second hollow truncated elements are provided with internal coating elements to avoid breakage.

3. A modular barbecue according to claim 1, wherein the two hollow truncated elements converge at their upper portions in the hollow element having a transversal partition, thus defining two separated conducts for independently conveying smoke produced in the front roasting chamber and in the rear combustion chamber.

* * * * *